(No Model.) 2 Sheets—Sheet 2.

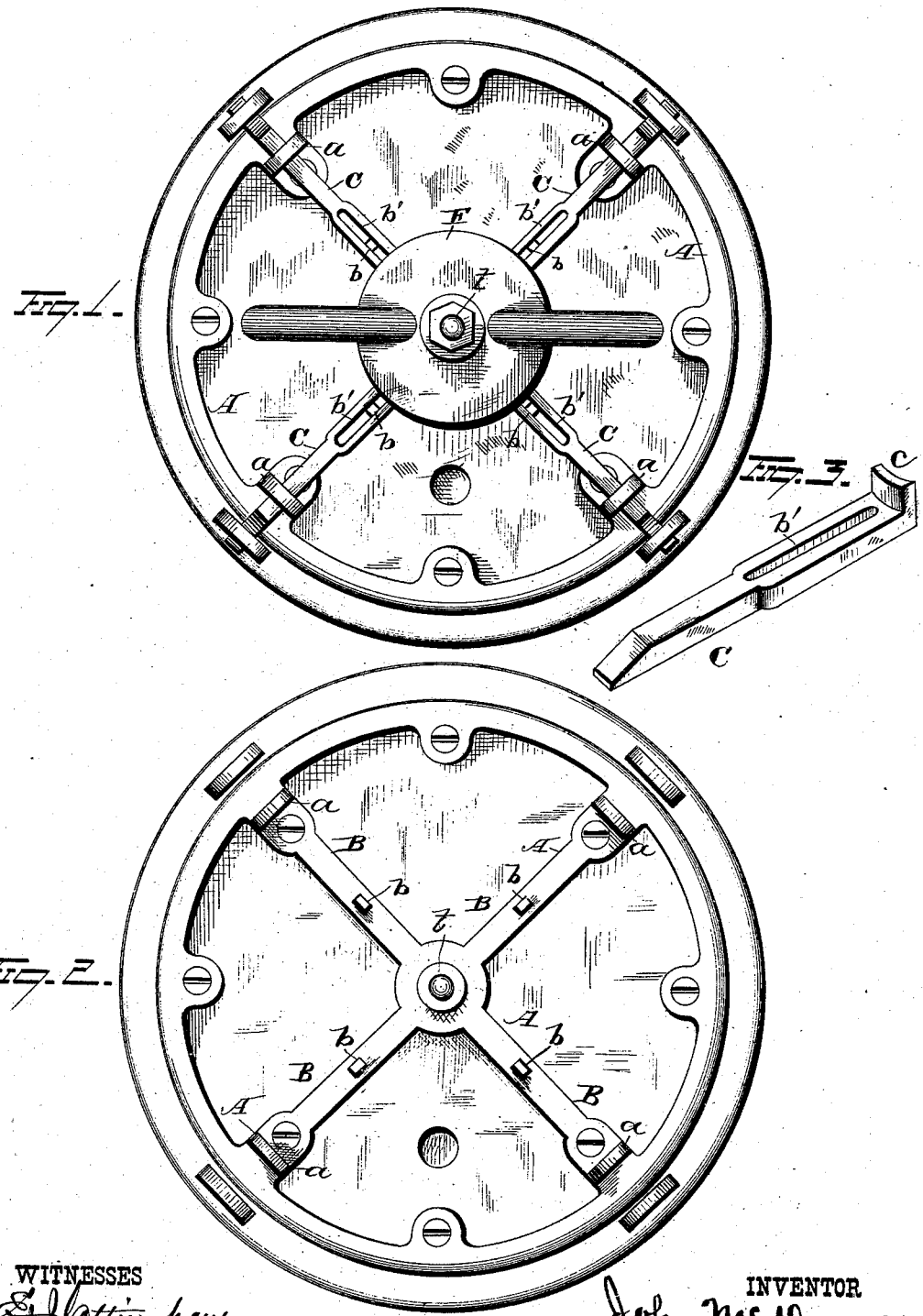

J. McDERMAID.
Revolving Churn Head.

No. 235,549. Patented Dec. 14, 1880.

WITNESSES
O. I. Nottingham
Herman Moran

INVENTOR
John McDermaid
By H. A. Seymour
ATTORNEY

UNITED STATES PATENT OFFICE.

JOHN McDERMAID, OF ROCKFORD, ILLINOIS.

REVOLVING CHURN-HEAD.

SPECIFICATION forming part of Letters Patent No. 235,549, dated December 14, 1880.

Application filed October 18, 1880. (No model.)

*To all whom it may concern:*

Be it known that I, JOHN McDERMAID, of Rockford, in the county of Winnebago and State of Illinois, have invented certain new and useful Improvements in Revolving Churn-Heads; and I do hereby declare the following to be a full, clear, and exact description of the invention, such as will enable others skilled in the art to which it pertains to make and use it, reference being had to the accompanying drawings, which form part of this specification.

The object of this invention is to provide improved means for guiding the radial bolts in the revolving churn-head patented to me October 5, 1880. In said patented churn-head the bolts are formed of the same section throughout their length. The outer extremities of the bolts work in loop-guides projecting from the corresponding portion of the arms of a metallic spider. The inner extremities of the bolts work between lugs formed on the spider-arms, and loops secured to the body of the churn-head fit over the inner extremities of the bolts, and also of the spider-arms.

My improvement is intended to provide a lighter and more simple construction of parts for securing the inner extremities of the bolts in operative position.

To this end the invention consists in forming the outer half of the length of the bolts of small section, and adapted to work in upright guide-loops cast on the spider-arms and forming the inner half of the length of the bolts of enlarged section, and provided with longitudinal slots, in which work upright studs cast on the inner extremities of the spider-arms.

Figure 5:
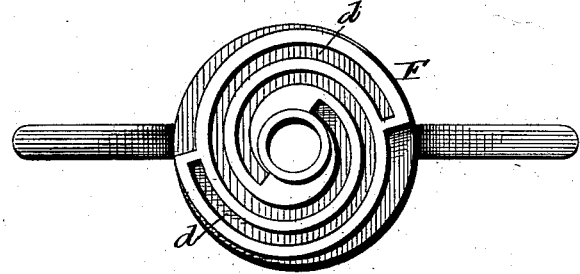
Figure 4:
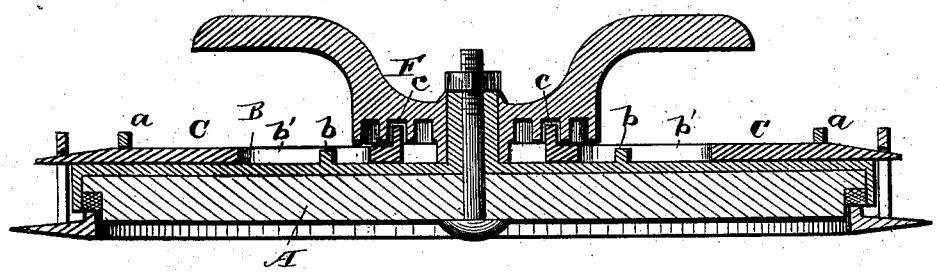

In the drawings, Figure 1 is a perspective view of a churn-head provided with the invention. Fig. 2 is a plan view of the head with the locking disk and bolts removed. Fig. 3 is a plan view of one of the bolts. Fig. 4 is a vertical central section through the churn-head. Fig. 5 is a detail view of the under side of the rotary disk.

The churn-head parts, with the exception of the parts herein specifically referred to, are of the same construction shown and described in the patent heretofore mentioned, and hence it will be unnecessary to describe them in this specification.

The metallic spider A is cast in single piece with all its various parts, as shown. The outer extremity of each arm B is cast with a loop-guide, $a$, and the inner extremity is cast with an upright stud, $b$. Each radial bolt C has the outer half of its length formed of small section and adapted to work in its appropriate loop-guide. The inner half of the length of each bolt is of larger section than its outer half, and is provided with a longitudinal slot, $b'$, in which the appropriate stud fits. The extreme inner ends of the bolts are respectively provided with vertical lugs $c$, which work in the spiral grooves $d$ of the rotary disk F. The bolts are in this manner adapted to be maintained in operative position upon their respective spider-arms, and they can be readily moved outward or inward.

The construction is simple in its parts, economical in manufacture, and efficient in operation.

Having fully described my invention, what I claim as new, and desire to secure by Letters Patent, is—

In a revolving churn-head, the combination, with the metallic spider having its arms cast with upright studs on their inner extremities, and with loop-guides on their outer extremities, and a rotary disk having its under side provided with spiral grooves, of radial bolts respectively having the outer half of their length formed of reduced section and sliding in the loop-guides, and the inner half of their length formed of enlarged section and provided with longitudinal slots, in which the studs fit, the extreme inner ends of the bolts being provided with vertical lugs working in the spiral grooves of the disk, substantially as set forth.

In testimony that I claim the foregoing I have hereunto set my hand this 9th day of October, 1880.

JOHN McDERMAID.

Witnesses:
 C. C. JONES,
 W. M. KIMBALL.